United States Patent [19]
Diddams et al.

[11] Patent Number: 6,025,911
[45] Date of Patent: Feb. 15, 2000

[54] BROADBAND ULTRASHORT PULSE MEASURING DEVICE USING NON-LINEAR ELECTRONIC COMPONENTS

[75] Inventors: Scott A. Diddams; Jean-Claude M. Diels, both of Albuquerque, N.Mex.; Prien Steffen, Bad Kissingen, Germany

[73] Assignee: University of New Mexico, Albuquerque, N.Mex.

[21] Appl. No.: 08/555,717

[22] Filed: Nov. 14, 1995

[51] Int. Cl.$^7$ ........................................ G01B 9/02
[52] U.S. Cl. ..................... 356/345; 356/346; 356/349
[58] Field of Search ........................ 356/345, 346, 356/349

[56] References Cited

U.S. PATENT DOCUMENTS

| | | | |
|---|---|---|---|
| 5,007,717 | 4/1991 | Cutolo et al. | 350/353 |
| 5,233,182 | 8/1993 | Szabo et al. | 250/214 |
| 5,293,397 | 3/1994 | Veligdas | 371/25 |
| 5,359,410 | 10/1994 | Diels et al. | 356/345 |
| 5,390,042 | 2/1995 | Ito et al. | 356/345 |
| 5,406,194 | 4/1995 | Dykaar et al. | 324/96 |

OTHER PUBLICATIONS

J. M. Diels et al., "Control and measurement of ultrashort pulse shapes (in amplitude and phase) with femtosecond accuracy," 24 Applied Optics No. 9, pp. 1270–1282 (1985).

J. L. A. Chilla et al., "Direct determination of the amplitude and the phase of femtosecond light pulses," 16 Optics Letters, No. 1, pp. 39–41 (1991).

C. Yan et al., "Amplitude and phase recording of ultrashort pulses," 8 J. Opt. Socl, Am. B, No. 6, pp. 1259–1263 (1991).

*Primary Examiner*—Frank G. Font
*Assistant Examiner*—Robert Kim

[57] ABSTRACT

A measuring device completely determines the characteristics of light pulses in a beam of ultrashort light pulses using optoelectronic detectors instead of second harmonic generating crystals. An optical system provides a spatial dispersion of an ultrashort pulse in at least one dimension. A two slit filter intercepts the dispersed beam whereby the transmitted spectra combine to provide a beat frequency within selected limits. An optoelectronic detector detects the beat frequency and outputs a signal functionally related to the beat frequency that contains spectral phase information that is sufficient to characterize the pulse. In another embodiment, a beam splitter splits the beam into first and second beams, wherein one of the beams is time delayed and the other beam is spectrally dispersed. The two beam are recombined to provide information about the spectral phase of the ultrashort pulse. The pulse is completely characterized when the spectral phase information is combined with amplitude information.

8 Claims, 8 Drawing Sheets

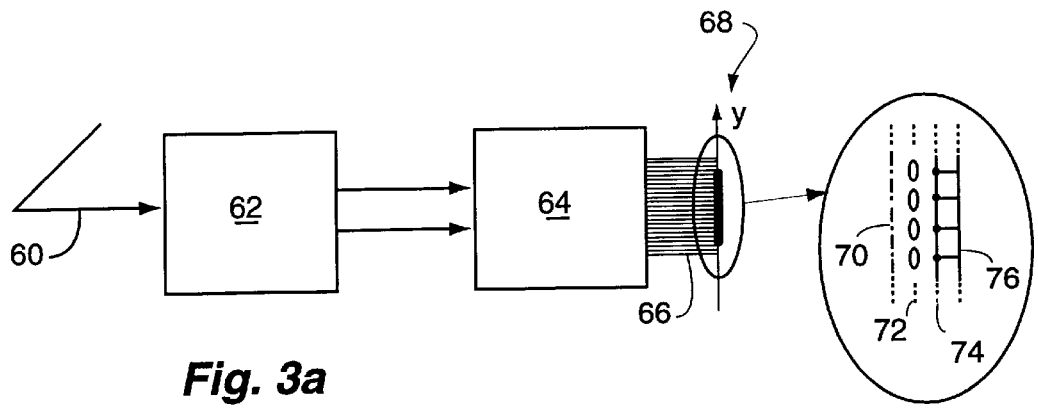
Fig. 3a
Fig. 3b
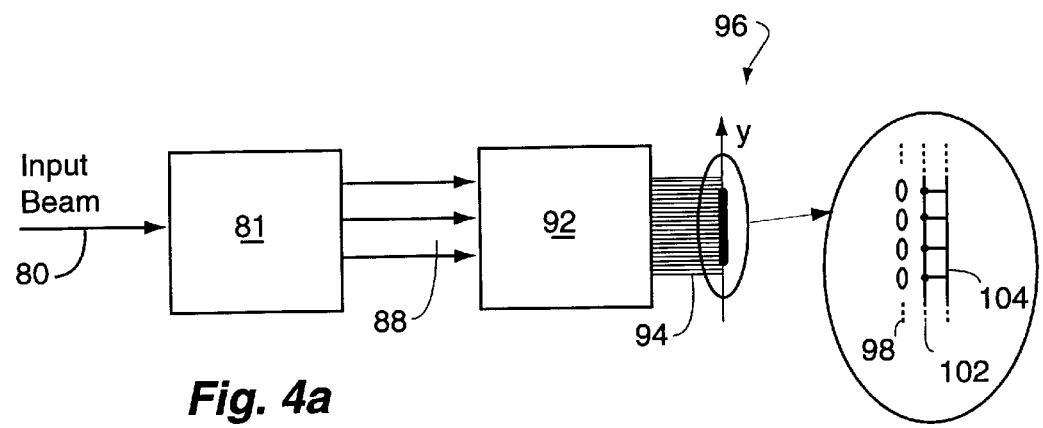
Fig. 4a
Fig. 4b
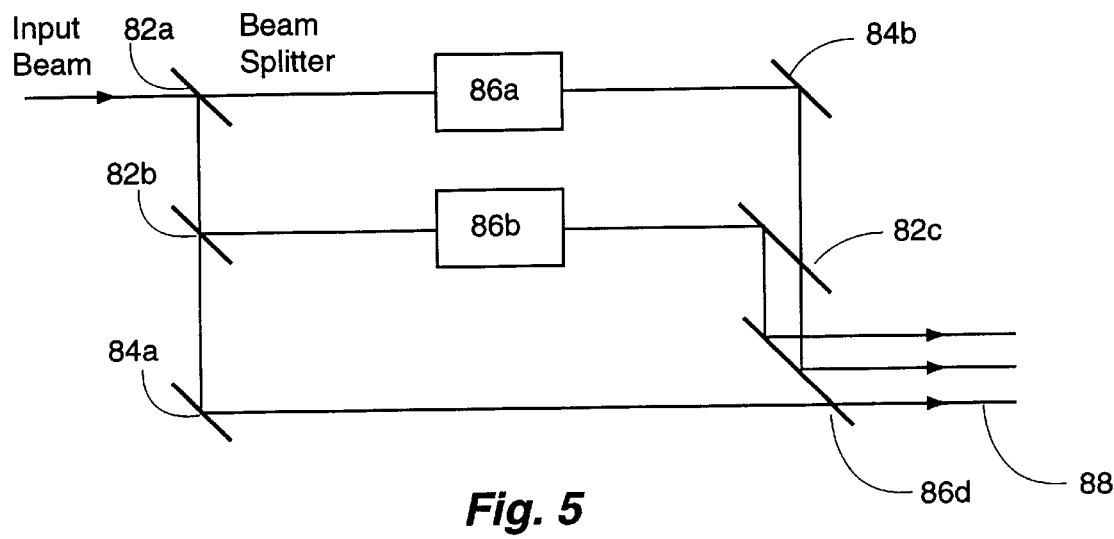
Fig. 5

BROADBAND ULTRASHORT PULSE MEASURING DEVICE USING NON-LINEAR ELECTRONIC COMPONENTS

BACKGROUND OF THE INVENTION

This invention relates to determining the characteristics of ultrashort laser pulses and, more particularly, the application of electronic devices for measuring parameters that completely characterize ultrashort laser pulses.

The development of ultrashort, i.e., picosecond and sub-picosecond, laser sources has largely precluded techniques for the accurate and complete characterization of the pulses coming from such lasers. Currently, the most commonly used measurement is the non-linear correlation. Unfortunately, this autocorrelation provides only an estimate of the pulse width, and contains no information about the specific amplitude and phase of the pulse.

Methods that lead to the determination of the phase and amplitude of the pulse include iterative fitting on an interferometric autocorrelation and the pulse spectrum, or generating asymmetric interferometric correlations with the insertion of quadratic dispersion in one arm of the correlator. More recent techniques involving higher order nonlinearities, combined with numerical algorithms, have been successfully introduced. While these techniques work well, they generally require high intensity pulses.

It should be noted that the common element in all of the measurements mentioned above is an optical nonlinearity with a femtosecond response time. Unfortunately, broadband nonlinearities are generally weak and require very intense ultrashort pulses. Some compromise between bandwidth and the magnitude of the nonlinear response can be made through the use of a phase matched crystal. In practice, however, a different crystal has to be used for different laser wavelengths. In view of this, there exists a need for an electronic device that covers a broad range of wavelengths. Initial work in this direction has been demonstrated in Li et al., "2-picosecond GaAs photodiode optoelectronic circuit for optical correlation applications," 61 Appl. Phys. Lett., pp. 3104–3106 (1992). A GaAs Schottky photodiode monolithically integrated with a microwave detector was used to perform correlations of picosecond optical pulses for time domain measurements on a train of laser pulses.

It is an object of the present invention to extend the temporal resolution of the GaAs Schottky photodiode monolithically integrated with a microwave detector to the ultrashort (picosecond to femtosecond) regime when used in a frequency domain measurement.

Another object of the present invention is to directly measure the amplitude and phase of an ultrashort laser pulse using only an integrated optoelectronic circuit.

One other object of the present invention is to determine the amplitude and phase of a single non-repetitive laser pulse using a two-dimensional integrated optoelectronic circuit.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a measuring device for determining characteristics of light pulses in a beam of ultrashort light pulses. An optical system provides a spatial spectral dispersion of the ultrashort pulse in at least one dimension. A two slit filter intercepts the spectral dispersion where the slits are displaced a distance effective to transmit first and second frequencies of said spectral dispersion effective to provide a beat frequency within selected limits. An optoelectronic detector detects the beat frequency and outputs a signal functionally related to the beat frequency that contains spectral phase information that is sufficient to characterize the ultrashort light pulse.

In another characterization of the present invention, a measuring device for determining characteristics of at least one pulse in a beam of ultrashort light pulses includes a beam splitter for splitting the beam into first and second beams. An optical disperser provides a spectral dispersion of the first beam along a first dimension, transverse to the direction of propagation. An optical delay provides delays of the second beam along a second dimension, also transverse to the direction of propagation and generally orthogonal to the first dimension. A second optical device combines the dispersed and time delayed beams to output a beam containing information about the spectral phase of the ultrashort pulses so that the ultrashort pulses are completely characterized when the spectral phase information is combined with amplitude information on the ultrashort pulses.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 3A and 3B are illustrations of an embodiment according to FIG. 2 having a one-dimensional electronic array for detecting beat frequency information.

FIGS. 4A and 4B are illustrative of an embodiment according to FIG. 2 using three spectra to develop beat frequency information for detection by a one-dimensional electronic array.

FIG. 5 is a schematic of an optical system for deriving three replica optical beams that are spatially displaced from one another.

Figure 10A:
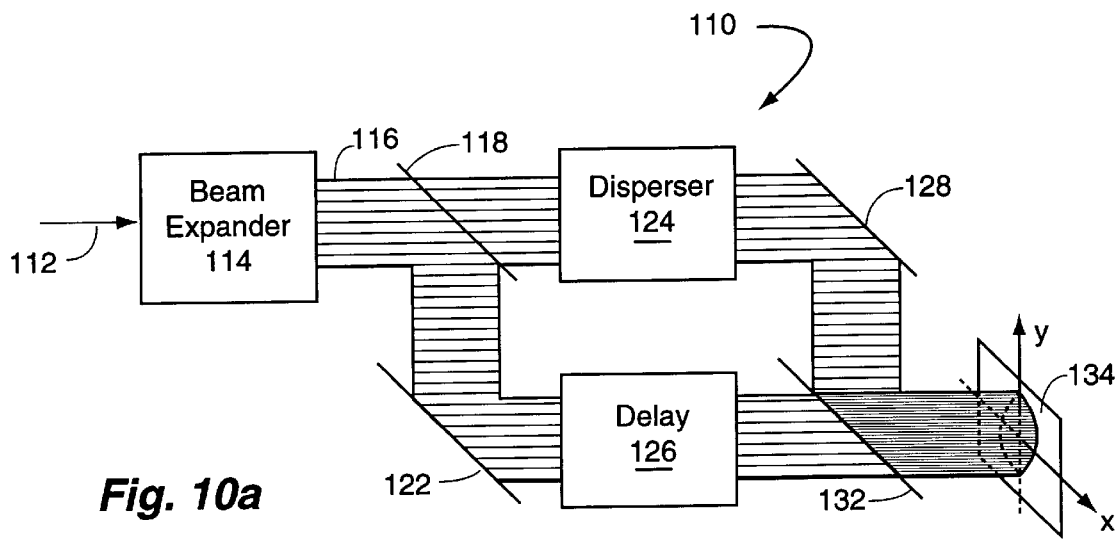
Figure 10B:
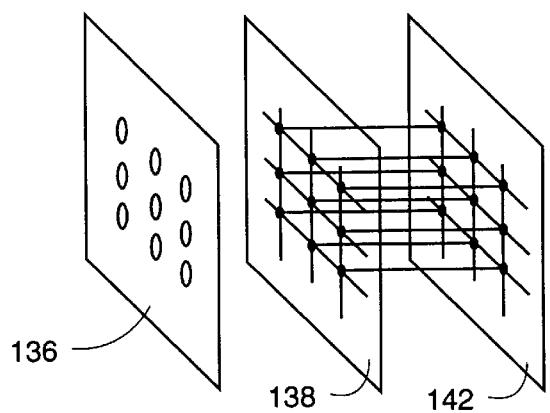

FIGS. 10A and 10B depict an optical system for developing the laser beam into a first beam having a spectral dispersion in one dimension and a second beam having a variety of time delays along a second dimension and a two-dimensional electronic array for providing a two-dimensional characterization of beam pulse characteristics.

DETAILED DESCRIPTION OF THE INVENTION

In accordance with the present invention, the amplitude and phase of a ultrashort pulse are directly detected using an integrated optoelectronic circuit, i.e., an all-electronic detection system outputting a signal that completely characterizes the ultrashort pulse. As described below for FIGS. 1–5, a first embodiment of the present invention generates a beat frequency for direct detection by an integrated optoelectronic circuit. FIGS. 6–10 depict a second embodiment generating a time domain correlation using both one- and two-dimensional optoelectronic circuit arrays.

Figure 1:
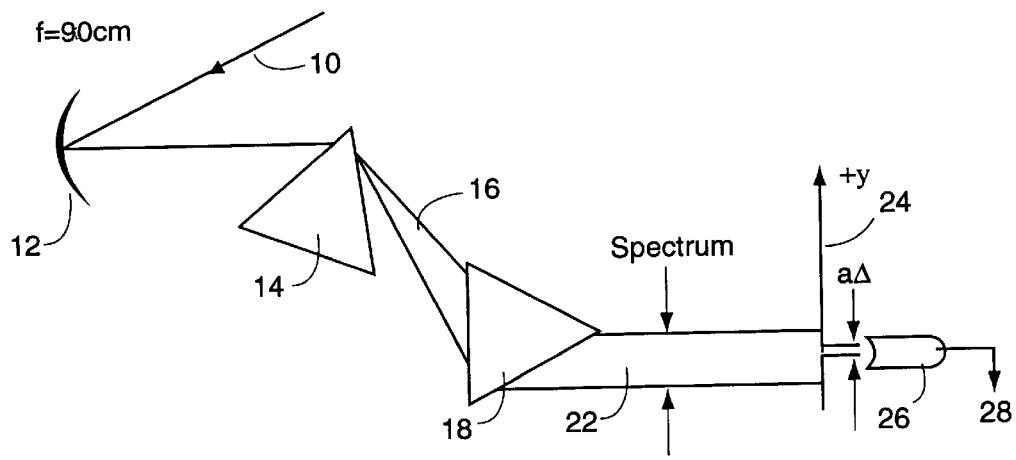
FIG. 1 is a pictorial illustration of a device for characterizing ultrashort pulses according to one embodiment of the present invention.

FIG. 1 generally depicts a schematic diagram of an optical system with optoelectronic detector for beat frequency measurement. Input pulse 10 is reflected by cylindrical mirror 12 into an optical prism 14 for spectrally dispersing the pulse to form dispersed beam 16. Dispersed beam 16 is input to prism 18 for forming collimated beam 22. Mirror 12 is selected to focus beam 10 to a IC) plane at the output of prisms 14 and 18. Prisms 14 and 18 are conventionally adjusted for zero group velocity dispersion (GVD) at the central frequency of the dispersed beam 22. It will be understood that prisms 14 and 18 are representative of a conventional spectrometer and may be replaced with numerous combinations of prisms and gratings that act to separate the spectral components of a pulse in one dimension with the constraint of zero or known GVD.

The respective phase of the various spectral components of beam 22 are determined by beating together two adjacent frequency components of the pulse spectrum forming dispersed beam 22. Assume that the separation of prisms 14 and 18 and position of the beam are chosen for zero GVD. After the beam has passed through prisms 14 and 18, in the absence of chirp, the energy front and wavefront forming beam 22 are both aligned along the coordinate y perpendicular to the propagation direction of the beam in the plane of the FIG. 1. If $\tilde{E}(\Omega)=E(\Omega)\exp(i\phi(\Omega))$ is the Fourier transform of a ultra-short pulse being sent through the spectrometer, the field along the axis y, assumed to be at the focal plane of the spectrometer is:

$$\tilde{E}(\Omega,y)=E(\Omega)e^{i\phi(\Omega)}e^{-(y+a\Omega)^2/w^2}, \qquad \text{Eqn. (1)}$$

where w is the beam waist and a is the dispersive power of the spectrometer having units of length/frequency. For simplicity, the spatial dependence of the field is only in the y direction.

As shown in FIG. 1, a two-slit filter 24 is placed in front of optoelectronic detector 26 and selects two frequency components $\Omega_1$ and $\Omega_2$ with phases $\phi_1(\Omega_1)$ and $\phi_2(\Omega_2)$. Mixing these two components produces a beat note of frequency $\Delta=\Omega_1-\Omega_2$ with a phase constant $\Phi=\phi_1(\Omega_1)-\phi_2(\Omega_2)$. The slits are sufficiently close that the spectral phase does not vary greatly between them so that the detector 26 records a beat note proportional to $$E(y/a)E(y/a+\Delta)\cos(\Delta t-\Delta\phi'(y/a))$$

Because of the reduced demand on detector speed, the phase has to be determined by integration of $$\phi'(y/a) = d\phi/d\Omega\,|_{(y/a)}.$$

Figure 2:
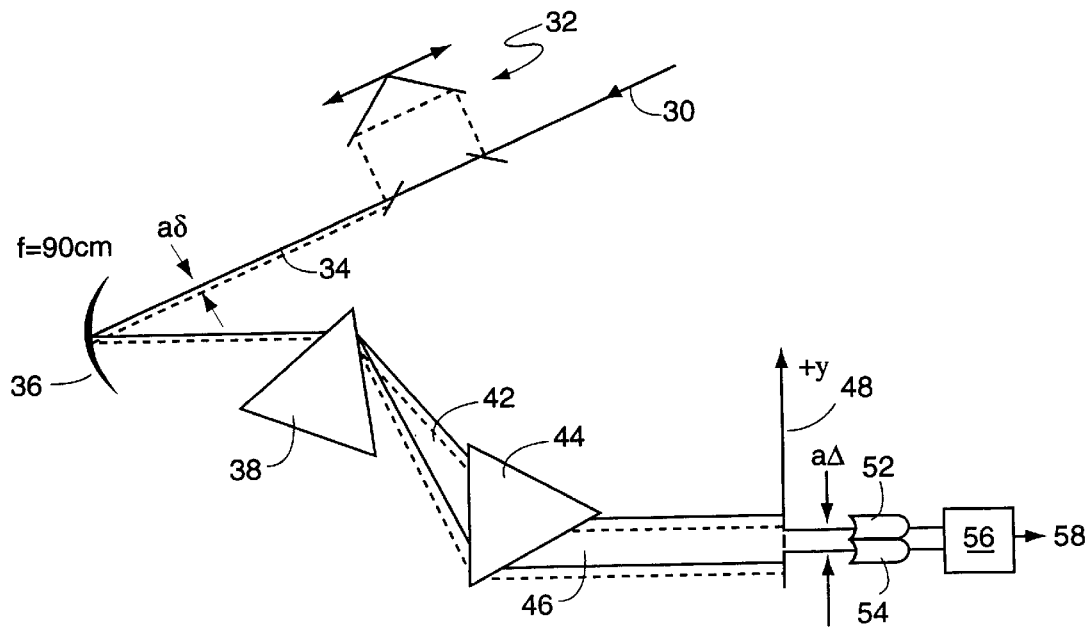
FIG. 2 is a pictorial illustration of a device for characterizing ultrashort pulses according to a second embodiment of the present invention.

The detector speed requirements can be reduced further by mixing two adjacent pairs of beat notes, and measuring the beat note between the beat signal of each pair. This measurement leads to the second derivative $d^2\phi/d\Omega^2$ and double integration is required to extract the phase function $\phi(\Omega)$. FIG. 2 schematically illustrates a system for providing the double beat frequencies.

Light pulse beam 30 is directed into spatial displacer 32, which outputs two light beams 34 spatially displaced by the small distance $a\delta$, where a is the dispersive power of prism 38. Spatially displaced beams 34 are directed onto cylindrical lens 36 and directed to dispersing prism 38 to form two overlapping beam spectra 42. Beams 42 are collimated by prism 44 to form two spatially displaced and spectrally dispersed beams 46 focused at two slit filter 48.

In the approximation of very large dispersive power a, the fields transmitted through filter 48 slits can be approximated by sine or cosine functions. If the spacing between the slits is $a\Delta$, the four transmitted field components are:

$$\tilde{E}_1(t,y)=E(y/a)e^{i((y/a)t+\phi(y/a))}$$

$$\tilde{E}_2(t,y)=E(t/a\delta)e^{i((y/a+\delta)t+\phi(y/a+\delta))}$$

$$\tilde{E}_3(t,y)=E(y/a+\Delta)e^{i((y/a+\Delta)t+\phi(y/a+\Delta))} \qquad \text{Eqn. (2)}$$

$$\tilde{E}_4(t/y)=E(y/a+\delta+\Delta)e^{i((y/a+\delta+\Delta)t+\phi(y/a+\delta+\Delta))}$$

Optical detectors 52, 54, e.g., photodiodes, output a signal proportional to $S_{1,2}(t,y)=|\tilde{E}_1+\tilde{E}_2|^2$, and $S_{3,4}(t/y)=|\tilde{E}_3+\tilde{E}_4|^2$, respectively, which are combined in microwave mixer 56. In another embodiment, only a single optoelectronic detector is used, where the detector receives and combines all of the incident fields. The detected signals have high frequency components at frequency $\delta$, with a phase proportional to $\delta\phi'(y/a)$ and $\delta\phi'(y/a+\Delta)$. The minimum frequency $\delta$ in Eqn. (2) is of the order of $w/a \approx 2\pi(100)$ Ghz The relative phase of $S_{1,2}$ and $S_{3,4}$ can be determined by combining the two signals in mixer 56 to output signal 58.

The preferred optoelectronic detector is the integrated photodiode/microwave detector taught by Li, supra. The current-voltage characteristics of the microwave detector produce a d.c. voltage that is proportional to the square of the signal coming from the photodiode. The output of the microwave detector in terms of the input optical fields is then proportional to $||\tilde{E}_{in}(t)|^2|^2$, where the first squaring is the result of the photodiode and second squaring results from the microwave detector. Additional advantages to such a semiconductor device are that is it sensitive to all wavelengths with energy greater than the band-gap energy, and it can detect optical powers on the order of only tens of microwatts.

Both optical detectors 52, 54 and mixer 56, or a single detector, are square-law detectors such that the output of the circuit in this case is proportional to $||\tilde{E}_1+\tilde{E}_2+\tilde{E}_3+\tilde{E}_4||^2|^2$. Since the frequency of oscillation is the same in both $S_{1,2}(t/y)$ and $S_{3,4}(t/y)$, the sum of these two frequencies will yield the product of a fast oscillation at frequency 6, and a slow modulation whose argument is $\delta[\phi'(y/a)-\phi'(y/a+\Delta)]\approx-\Delta\phi''(y/a)$. The exact expressions for the output of the circuit is $$S \propto \left\| \tilde{E}_1 + \tilde{E}_2 + \tilde{E}_3 + \tilde{E}_4 \right\|^2|^2 \qquad \text{Eqn. (3)}$$

$$\propto 54 + 16\cos(\Delta^2 \phi''(y/a)).$$

In the above equation, $\delta = \Delta$ and the rapidly oscillating terms beyond the speed of electronic display instrumentation have been dropped. When two-slit filter 48 is scanned along the y-axis in front of detectors 52, 54, the detected signal varies as $\cos\phi''(y/a)$. Reconstruction then involves twofold integration to obtain $\phi(y/a)$.

FIGS. 3A and 3B illustrate another embodiment of the system shown in FIG. 2. Light pulse beam 60 is input to spatial displacer 62 and split into two identical pulses that are spatially separated by a small distance, as discussed above. The two identical pulses are then dispersed by disperser 64, which may be either prisms or gratings. The output beam 66 from disperser 64 in input to one-dimensional array 68, more particularly depicted in FIG. 3B. Slitted mask 70 selects spectral components from dispersed beam 66 and microlens array 72 focuses the spectral components onto optoelectronic detector array 74. The photodiode/microwave detectors of array 74 detect the beat frequency between adjacent spectral components and each detector in array 72 outputs a signal that is a constant current proportional to the cosine of the second derivative of the phase to electronic readout array 76. Since there is no mechanical motion required to provide the output frequency beat signals, the characteristics of only a single pulse can be determined.

Yet another implementation of a beat frequency measurement system is shown schematically in FIGS. 4A, 4B, and 5. Input light pulse beam 80 is input to shifter 81, more particularly shown in FIG. 5. Shifter 81 may include beam splitters 82a, 82b, which transmit a portion of beam 80 to delays 86a, 86b, and mirror 84b and beam splitter 82e, respectively. A third portion of beam 80 is simply reflected by mirror 84a through beam splitter 86d, whereby three spatially displaced beams 88 are output to disperser 92. Three spatially separated and spectrally dispersed beams 94 are formed. Any portion of beam 94 contains beams that combine to form beat frequencies of beat frequencies, as discussed above, without the need for a slit structure. Thus, beam 94 is directly incident on microlens array 98 and focused on optoelectronic detectors 102, which output beat frequency signals for processing by associated electronic readout 104. Since there is no mechanical scanning required to provide the output frequency beat signals, the characteristics of only a single pulse can be determined. In another use of the optoelectronic detector, time correlation measurements are made to find the time of arrival of the various spectral components which make up a ultrashort pulse. FIG. 5 depicts interferometer 150 using a single photodiode/microwave detector 178, where the delay and the spectrum are scanned mechanically to provide a cross correlation between different spectral slices of the original pulse with itself. The relative delay of the spectral components with respect to each other provides information about any phase modulation that may be present.

Input light pulse beam 154 is input through half-waveplate 154 to polarizing beam splitter 156 where a portion of the beam passes through quarter waveplate 158 to mirror 165 through oscillating corner cube 162 driven by function generator 164 in a conventional manner. The beam returns to cylindrical lens 178 with an oscillating time delay. A second portion of beam 152 passes through quarter-waveplate 166 and is reflected and dispersed into spectral components by grating 168. The dispersed beam is collimated by lens 172 and is incident on mirror slit 174, which act as a spectral filter to select a narrow band of frequencies out of the broad pulse spectrum. The position of the slit portion of mirror 174 reflects a selected portion of the spectrum from the beam, with the selected spectral slice being reflected back through lens 172, grating 168, and beam splitter 156 to cylindrical lens 178. Lens 172 and grating 168 are aligned to ensure that there is no GVD between the spectral components making up the pulse.

The combined beams having the full pulse at varying time delays and a selected spectral slice are focused by cylindrical lens 178 onto optoelectronic detector 182. The output signal is conventionally amplified by amplifier 184 and displayed on oscilloscope 186 for analysis.

Mathematically, the filtering in the frequency domain by mirror slit 174 can be described by the product of the pulse spectrum $\tilde{E}(\Omega) = E(\Omega) \exp(i\Omega t)dt$ and the filter transmission function $H(\Omega)$, where the spatial dependence of Eqn. (1) has been dropped for simplicity. The time domain representation is then obtained from the Fourier transform $$\tilde{E}(t) \int \tilde{E}(\Omega) H(\Omega) \exp(i\,\Omega t) dt. \qquad \text{Eqn. (4)}$$

If the filter is narrow compared to the pulse spectrum such that the spectral phase and amplitude do not vary greatly over the width of the filter, then the spectral amplitude may be replaced by the constant $\tilde{E}(\Omega) = E_0$ and the spectral phase replaced by the first two terms of a Taylor series expansion $\phi(\Omega_0) = \phi + \phi_0' \Omega_0$. The subscript "o" denotes the evaluation of the respective functions at the center frequency of filter slit 174. With these substitutions, the integral in Eqn. (4) may be evaluated for a rectangular filter:

$$\tilde{E}(t) \, E_0 \exp(i\phi_0) \sin c(d(t+\phi_0)), \qquad \text{Eqn. (5)}$$

where d is the half-width of the mirrored slit. Eqn. (5) describes a temporally broadened pulse delayed by the first derivative of the spectral phase. This delay is measured by cross-correlating the spectral slice with the original pulse. If mirrored slit 174 is scanned across the spectrum, the relative delay between the frequency components making up the pulse is recorded by oscilloscope 186, or the like. An analytic function is fit to the measured valued of $\phi'(\Omega)$, and integration of this function yields the spectral pulse. When combined with the spectral amplitude (obtained with a standard spectrometer), the pulse is fully characterized. A Fourier transform then yields the temporal representation of the pulse.

In accordance with the present invention, the relative maxima of the cross-correlation is determined with integrated photodiode/microwave detector 182, taught by Li, supra, in place of a conventional nonlinear crystal. The output of microwave detector 182 in terms of the input optical fields for this case is proportional to $\|\tilde{E}_1(t) + \tilde{E}_2(t-\tau)\|^2|^2$. Although the temporal response of the photodiode/microwave detector combination is much slower than that of the second harmonic process, frequency domain measurements can still be performed. This is because is the position of the peak of the cross-correlation that is required, and this position can be determined with an accuracy better than 50 fs.

To verify the application of the photodiode/microwave detector to the characterization of ultrashort pulses, measurements were made on pulses coming from a Ti:Sapphire laser operating near 800 nm. A standard autocorrelation performed in a nonlinear crystal set the pulse length at 100 fs (FWHM), assuming Gaussian pulses. A simultaneous measurement of the intensity spectrum yielded a bandwidth of 4.6 Thz (FWHM). This results in a time-bandwidth product of $\Delta\tau\Delta\upsilon=0.46$, which is close to the Fourier limit.

Figure 6:
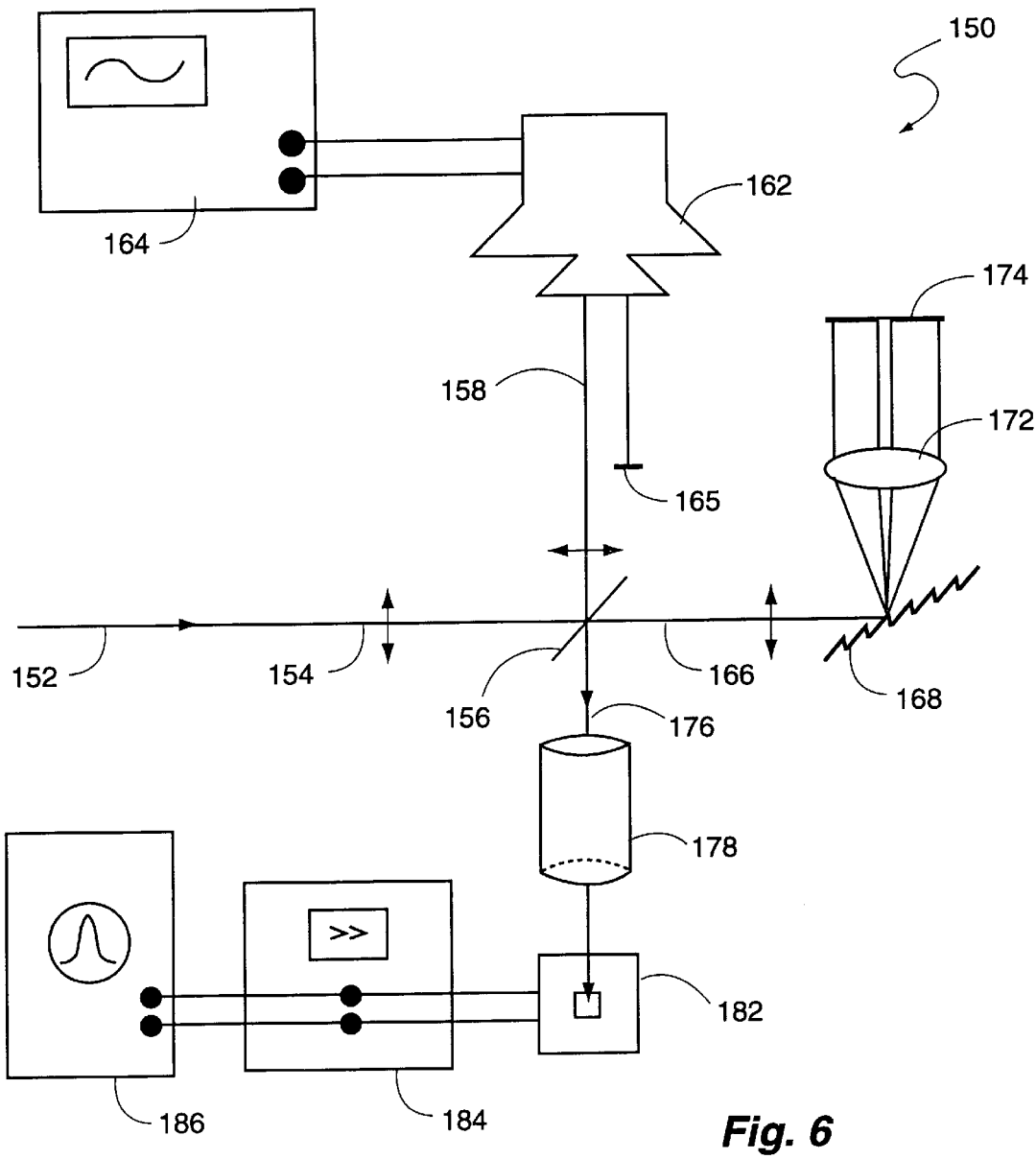
FIG. 6 depicts an interferometer for correlating selected spectral beam pulse characteristics with time delayed beams.
Figure 7A:
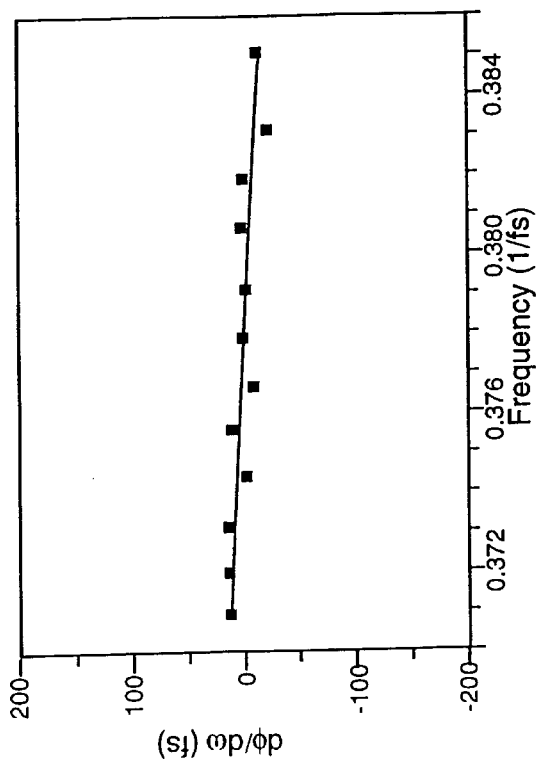
FIGS. 7A, 7B, and 7C graphically depict measured cross-correlation data and polynomial fit for pulses coming directly from a Ti:Sapphire laser, reconstructed amplitude and phase of the pulses, and the intensity profile of the pulse, respectively.
Figure 7B:
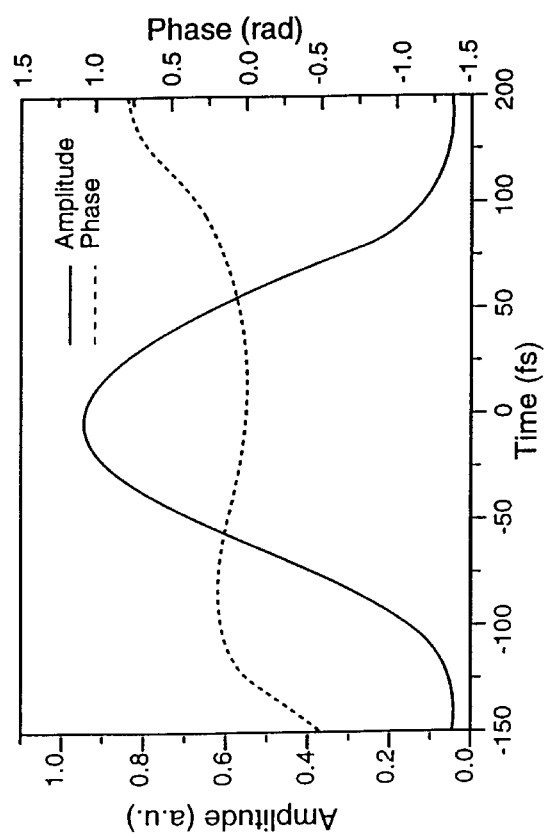
Figure 7C:
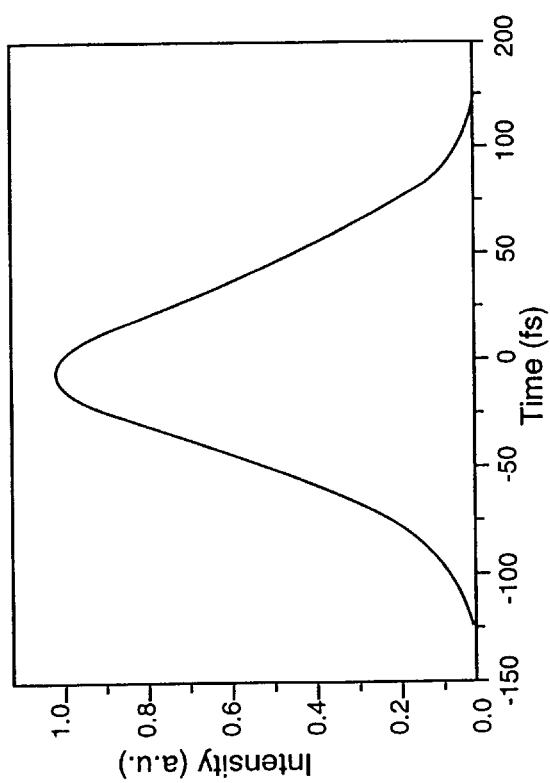

Using the configuration shown in FIG. 6, the photodiode/microwave detector 182 was then used to measure $\phi'(\Omega)$ directly (peak of the cross-correlation, discussed above). The results are shown in FIG. 7A, where the squares are the actual data and the line is a second order polynomial fit. The flatness of the data indicates that very little phase modulation exists on the pulses coming directly from the laser. The polynomial fit was integrated to give $\phi(\Omega)$, while the square root of the intensity values of a standard intensity spectrum yields $E(\Omega)$. The time domain representation (amplitude and phase) of the pulse was then reconstructed via a Fourier transform and the results are shown in FIG. 7B. The oscillations in the phase are of little significance since they are well into the wings of the pulse. They are the result of a slight asymmetry in the pulse spectrum. The intensity profile of the reconstructed pulse (shown in FIG. 7C) has a FWHM of 94 fs. The 6 fs difference between this value and that obtained from the nonlinear autocorrelation is within the accuracy of both measurements. A Gaussian fit to the data is also plotted in FIG. 7C, but is hardly distinguished from the reconstructed pulse.

Figure 8A:
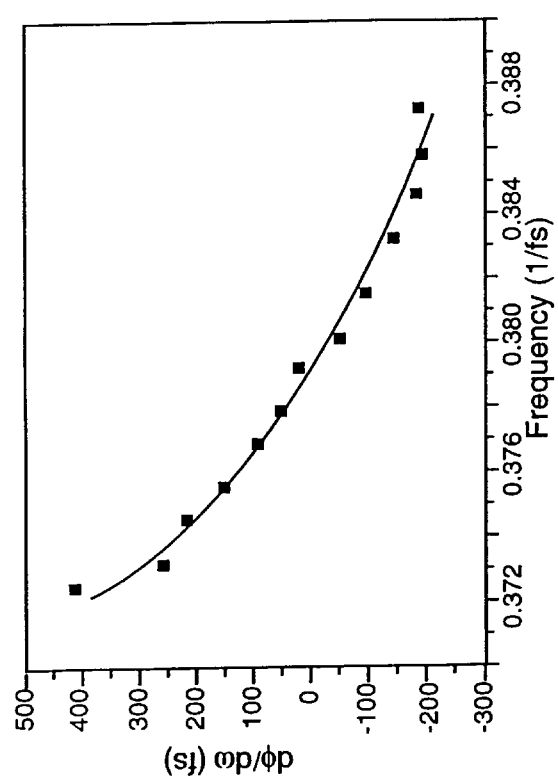
FIGS. 8A, 8B, and 8C graphically depict measured cross-correlation data and polynomial fit for pulses from a Ti:Sapphire laser passing through 5 cm of SF5 glass, the reconstructed amplitude and phase of the pulses, and the intensity profile of the pulse, respectively.
Figure 8B:
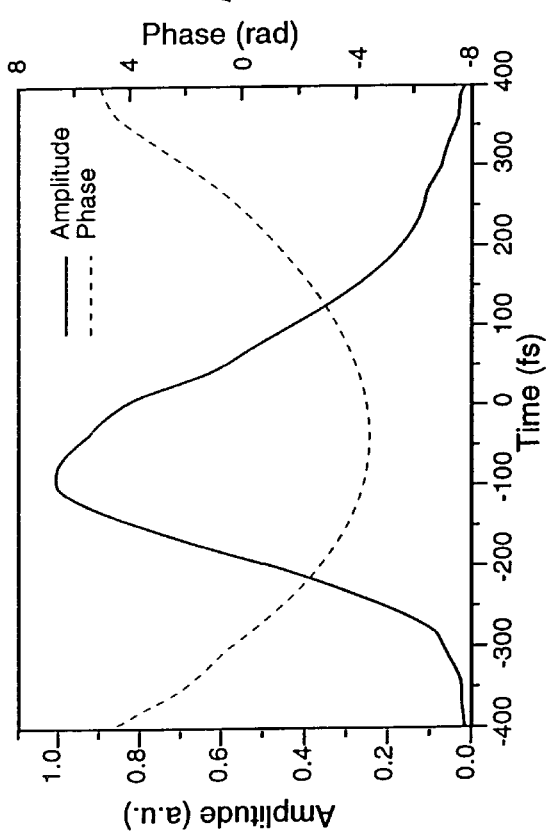
Figure 8C:
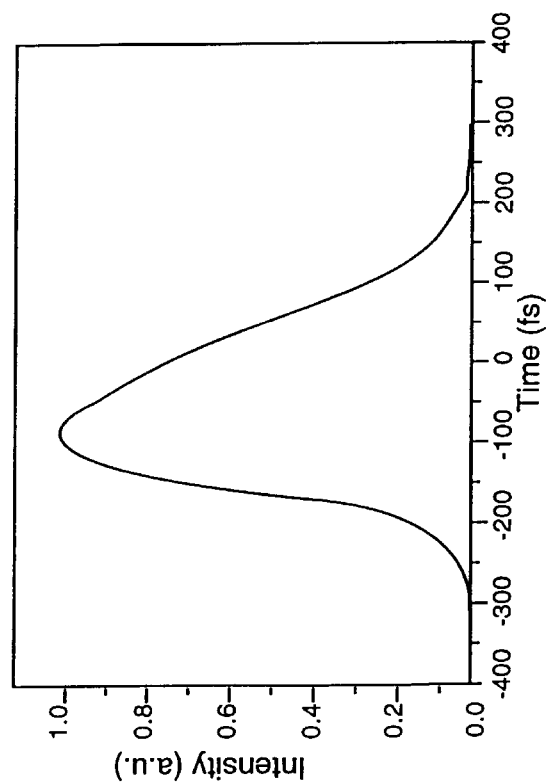

In order to verify the technique on a phase modulated pulse, a 5 cm piece of SF5 glass was placed in the beam path before the correlator. The result of the measurement of $\phi'(\Omega)$ is shown by the square data points of FIG. 8A. As can be seen, a considerable amount of modulation exists. Once again the second order polynomial fit to the data (shown as a solid line) can be integrated to yield $\phi(\Omega)$, and, when combined with the square root of a conventionally measured power spectrum, the pulse is fully characterized. A Fourier transform was performed to yield the time domain representation of the pulse in amplitude, and is shown in FIG. 8B. As would be expected after propagation through glass, the temporal phase is largely quadratic with positive curvature indicating an up-chirped pulse in which higher frequency components trail the low frequency components. The full-width half-max (FWHM) of the intensity profile of the pulse shown in FIG. 8C is 205 fs, giving it a time-bandwidth product greater than two times the limit for a Gaussian pulse.

Figure 9:
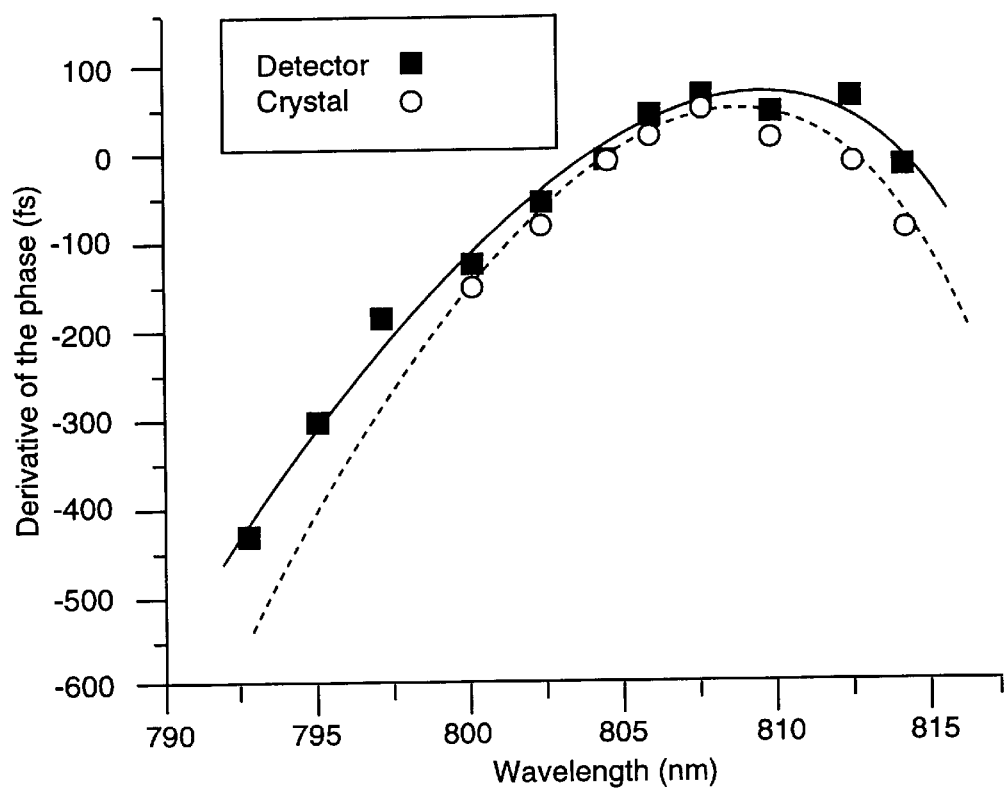
FIG. 9 graphically illustrates measured cross-correlation data (and polynomial fits) taken with a photodiode/ microwave detector according to the present invention and with a nonlinear crystal and PMT according to the prior art.

Finally, as a means of checking the accuracy of the technique, the measurement of $\phi'(\Omega)$ was repeated on a chirped pulse using both a non-linear crystal (KDP type-II) with a photomultiplier tube and with the integrated photodiode/microwave detector circuit. The result is shown in FIG. 9. The agreement between the two detection methods is excellent, leading to the conclusion that the photodiode/microwave detector can resolve differences in correlation peaks with a resolution better than 50 fs. The data of FIG. 9 also demonstrates an important advantage of the integrated detector, that it can be used with low light levels. Measurements are possible with as little as 100 µW total average power incident on the detector. This enabled detection of the correlation well into the wings of the spectrum where intensities were too low for nonlinear detection.

A general implementation of a time domain correlator with all-electronic detection is shown schematically in FIGS. 10A and 10B. This implementation can characterize only a single pulse since it requires no mechanical scanning of delay or frequency, which require multiple pulses to generate the required information. In this case, the two axes of an electronic array become the frequency and time delay axes. An input pulse laser beam 112 is expanded by beam expander 114 to form expanded beam 116 with a diameter of, e.g., 1–2 cm. Beam 116 is split by beam splitter 118. A first beam portion is directed to disperser 124 to disperse the beam spectrum using either gratings of prisms and is focused by cylindrical optics within disperser 124 to spread the spectrum along the y-axis of the plane of detector 134.

A second portion of beam 116 is reflected by beam splitter 118 and mirror 122 to provide a time reference. Temporal delay 126 may be conventionally formed from glass wedges or a prism. The beams are combined along the output of beam splitter 132 and the time delay is displayed along the x-axis of two dimensional array 134.

Two dimension electronic array 134 consists of three basic layers, as shown in FIG. 10B, that could be integrated into a single device. First layer 136 consists of an array of microlenses of e.g., an N×N array, which focus the overlapping beams onto a congruent N×N array of photodiodes/microwave detectors (the second layer). The third layer is a charge coupled device (CCD) 142 consisting of an array of capacitors and gating circuitry, which permits the readout of the signal coming from each of the detectors of the second. The two dimensional array eliminates the need for a spectrum selective mirror, such as shown in FIG. 6 since each temporal slice is correlated with a complete spectral slice.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A measuring device for determining characteristics of at least one light pulse in a beam of ultrashort light pulses, comprising:

optical means for providing a spectral dispersion of said ultrashort pulses in at least one dimension;

a two-slit filter intercepting said spectral dispersion wherein said two slits are displaced a distance effective to transmit first and second frequencies of said spectral dispersion to provide a beat frequency within selected limits;

an optoelectronic detector effective to detect said beat frequency and output a signal functionally related to said beat frequency, which contains spectral phase information that is sufficient to characterize the ultrashort light pulse.

2. A measuring device according to claim 1, further including means for spatially displacing a portion of each said pulse and recombining said portion of each said pulse with said pulse to form a beat frequency spectrum of said pulse, wherein each slit of said filter transmits a frequency at said beat frequency of said recombined portion of each said pulse and said pulse.

3. A measuring device according to claim 2, wherein said optoelectronic detector includes two optical detectors, where each optical detector is effective to detect said beat frequency from a corresponding one of said slits.

4. A measuring device according to claim 3, further including a microwave detector for mixing said beat frequencies received from each said optical detector and outputting a signal functionally related to a second beat frequency derived from combining a signal from each said optical detector.

5. A measuring device according to claim 4 wherein said two slit filter is a fixed array of pairs of slits and an associated lens effective to focus a beat frequency signal on said optoelectronic detector associated with said pair of slits.

6. A measuring device for determining characteristics of at least one light pulse in a beam of ultrashort light pulses, comprising:

means for dividing said beam into three replica beams that are spatially shifted with respect to each other;

means for dispersing said three replica beams into an overlapping spectral array of spectrally shifted beams;

an array of lenses for receiving said overlapping spectral array, where each lenses focuses a received portion of said overlapping array at a selected focal point;

an array of optoelectronic detectors at said focal point, each one of said optoelectronic detectors receiving said overlapping portion of said spectral array and outputting a signal functionally related to beat frequencies of said three replica beams.

7. A measuring device for determining characteristics of at least one light pulse in a beam of ultrashort light pulses, comprising:

a beam splitter for splitting said beam into first and second beams;

an optical disperser for providing a spectral dispersion of said first beam in at least one dimension;

an optical delay for providing delays of said second beam along at least one dimension;

a spectral filter for selecting a band of frequencies from said spectral dispersion of said first beam; and at least one optoelectronic detector for receiving said band of frequencies and said second beam at said delays and outputting a signal indicative of the relative delay between frequency components forming said ultrashort light pulses from which the spectral phase is determined.

8. A measuring device according to claim 7, wherein said at least one optoelectronic detector is a two-dimensional array for outputting a two-dimensional representation of spectral dispersion and time delay for characterizing said ultrashort light pulses.

* * * * *